United States Patent [19]

Killgrove

[11] Patent Number: 4,703,967

[45] Date of Patent: Nov. 3, 1987

[54] SELF-LOCKING DOUBLE RETENTION REDUNDANT PULL PIN RELEASE

[75] Inventor: Thomas O. Killgrove, Frazier Park, Calif.

[73] Assignee: The United States of America as represented by the Administrator of the National Aeronautics and Space Administration, Washington, D.C.

[21] Appl. No.: 737,018

[22] Filed: May 23, 1985

[51] Int. Cl.$^4$ .............................................. B64D 17/38
[52] U.S. Cl. .............................. 294/82.24; 294/82.25; 294/82.26; 294/82.27
[58] Field of Search ............... 294/82.24, 82.25, 82.26, 294/82.27, 82.35; 244/149, 151 B; 114/378, 217

[56] References Cited

U.S. PATENT DOCUMENTS 1,829,293 10/1931 Olson .
1,930,148 8/1909 Brown .
3,120,365 2/1964 Gutacker .......................... 244/149
3,295,579 1/1967 Medal .................................... 151/33
3,865,333 2/1975 Fielding et al. ................. 294/82.25
4,237,949 12/1980 Wagner ................................ 151/67

Primary Examiner—James B. Marbert
Attorney, Agent, or Firm—Paul F. McCaul; John R. Manning; Thomas H. Jones

[57] ABSTRACT

A double-retention redundant pull pin release system is disclosed. The system responds to a single pull during an intentional release operation. A spiral-threaded main pin is seated in a mating bore in a housing, which main pin has a flange fastened thereon at the part of the main pin which is exterior to the housing. Accidental release tends to rotate the main pin. A secondary pin passes through a slightly oversized opening in the flange and is seated in a second bore in the housing. The pins counteract against one another to prevent accidental release. A frictional lock is shared between the main and secondary pins to enhance further locking of the system. The secondary pin, in response to a first pull, is fully retracted from its bore and flange hole. Thereafter the pull causes the main pin to rotate free of the housing to release, for example, a parachute mechanism.

20 Claims, 4 Drawing Figures

SELF-LOCKING DOUBLE RETENTION REDUNDANT PULL PIN RELEASE

BACKGROUND OF THE INVENTION

1. Origin of the Invention

The invention described herein was made in the performance of work under a NASA Contract and is subject to the provisions of Section 305 of the National Aeronautics and Space Act of 1958, Public Law 85-568 (72 STAT 435; 43 USC 2457).

2. Field of the Invention

This invention relates to a pull pin release system and more particularly to a release system which, although responsive to a single pull, still provides redundant self-locking features. These features allow the pull pin release system to withstand accidental release due to inertial loads caused by vibration, shock or the like.

3. Background Discussion

Modern aircraft and space technology present a requirement for a pull pin release system which will positively respond to a single pull and yet will not accidentally release. Satellites and spacecraft are particularly subjected to wide variations in inertial loads caused by acceleration, vibration and shock. A pull pin release system must withstand a wide variety of these loads and still avoid accidental release. To improve efficiency by reduced weight and simplicity of operation, the pull pin system should respond to a single pull on one lanyard.

Despite the countless number of locking and release assemblies, there is a need for an improved system. The prior art lock nut assemblies have made use of a secondary pin to prevent a threaded fastener from being released. In general, the secondary pin relies upon deformation or upon manual removal to deter an undesirable release. Typical of such prior art is a U.S. Pat. No. 1,829,293 which discloses a screw lock which includes a threadless secondary pin that is force driven into an aperture jointly drilled in the workpiece and in the threaded bolt to be locked in place. No means of readily withdrawing the secondary pin is taught or suggested.

In other prior art, of which U.S. Pat. No. 4,237,949 is typical, the secondary pin is a threaded set screw. Such a secondary pin is not smooth-surfaced and would not readily respond to a single pull for a positive release.

Another related boy of prior art is the parachute release art. In this art the release arrangement must react positively in response to a single pull and yet it must withstand vigorous handling, vibration and shock. Exemplifying this prior art is U.S. Pat. No. 3,120,365 to H. C. Gutacher. A pull pin is released by an angular pull. A relatively complicated pawl and ear mechanism is activated to release the parachute. As far as can be determined from the drawings and disclosure of the '365 patent, there is no provision of a double-locking redundant pull pin release, nor is the device disclosed in the '365 patent simple in operation when compared to the present invention.

SUMMARY OF THE INVENTION

Briefly, the subject invention comprises an elongated main pin having helix grooves formed along the length thereof and a flange having a hole therethrough. The hole accepts a slightly smaller secondary pin. The helix grooves on the main pin mate with matching landings which causes the main pin, when the system is in an armed or locked position, to rotate if it is attempted to be withdrawn from a housing in which the main pin and the secondary pin are seated. The rotational force of the main pin is countered by a force of the secondary pin in the receiving hole and against the shoulder of the hole in the flange.

In one preferred embodiment a friction lock, which may take the form of a rubber "O"-ring, seated in a receiving groove in the housing, surrounds the main pin when it is seated. The "O"-ring is sandwiched at a contact point between the secondary and the main pin. The secondary pin positively locks the main pin into its inserted position by preventing any significant rotation of the main pin. Assuming that an inertial load attempts to disengage the main pin, the main pin must rotate as it tends to move toward a release position. That movement is countered by the frictional lock and by the counteracting forces of the main and secondary pins. Thus both pins have a frictional lock and the additional locking results from the pins themselves. This structure thus provides double-retention and redundant pull pin safety features.

Since both the main pin and the secondary pin are parallel and close together, they can be pulled with a single split-end lanyard. The lanyard has two end strands allowing different retraction times by one pulling force. The lanyard strand for the main pin reacts only after the secondary pin has been fully released by a first pull on its lanyard strand. Once the secondary pin has been released, the frictional lock is reduced and rotation of the main pin is provided in response to the second pull on that pin's lanyard strand.

DETAILED DESCRIPTION OF THE DRAWING

Figure 1:
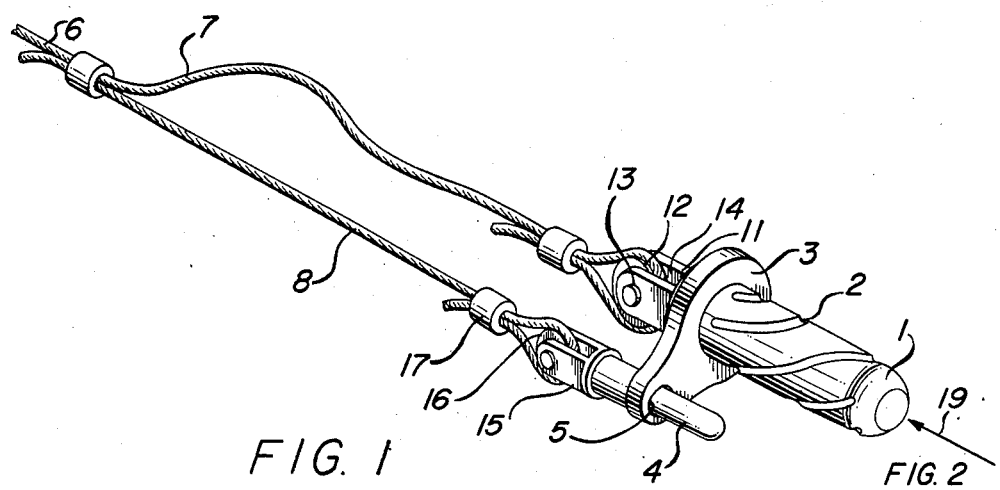
FIG. 1 is a perspective of the main pin, its flange, the secondary pin and a single pull lanyard.

FIG. 1 depicts, in perspective, an elongated main pin 1 having spiral grooves 2 along the outer peripheral surface of the pin 1. Pin 1 may be machined from flange 3. Obviously, pin 1 may be suitably fastened to flange 3 by welding, threaded connection or the like.

Located on flange 3 on the side opposite from pin 1 is an upstanding bracket 11 having a pulley wheel 12 rotatably mounted on a shaft 13 in a pulley recess 14 at the outer end of bracket 11. Connected around pulley 12 is the longer extension 7 of a split-end lanyard 6.

A secondary pin 4, having its elongated axis parallel to the axis of main pin 1, extends away from flange 3 in the same direction as main pin 1. Secondary pin 4 is a smooth-surfaced and passes through a slightly oversized aperture 5 located through flange 3. The base of pin 4 is suitably threaded or otherwise connected to a pulley bracket 15 which rotatably houses the secondary pin's pulley 16 in a slotted end thereof. The shorter strand 8 of lanyard 6 passes around pulley 16 and is suitably fastened back upon itself by collar 17.

Figure 2:
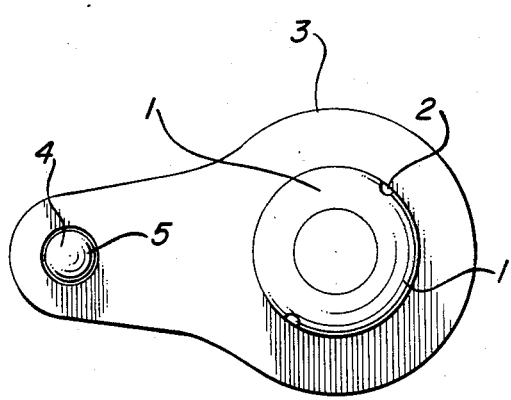
FIG. 2 depicts an end view of the flange and pin assembly of FIG. 1 as seen from the arrow of FIG. 1.

FIG. 2 generally depicts the end view taken at arrow 19 in FIG. 1. As shown by the end view, the longitudinal axis of both main pin 1 and secondary pin 4 are parallel with each other. Although shown as two separate spaced-apart pins 1 and 4, pin 4 could be seated in a hole bored partially in flange 3 and into main pin 1 as shown by the dashed circle 10. In either event, the arrangement produces an easy release by a single pull on the lanyard 6, FIG. 1.

Figure 3:
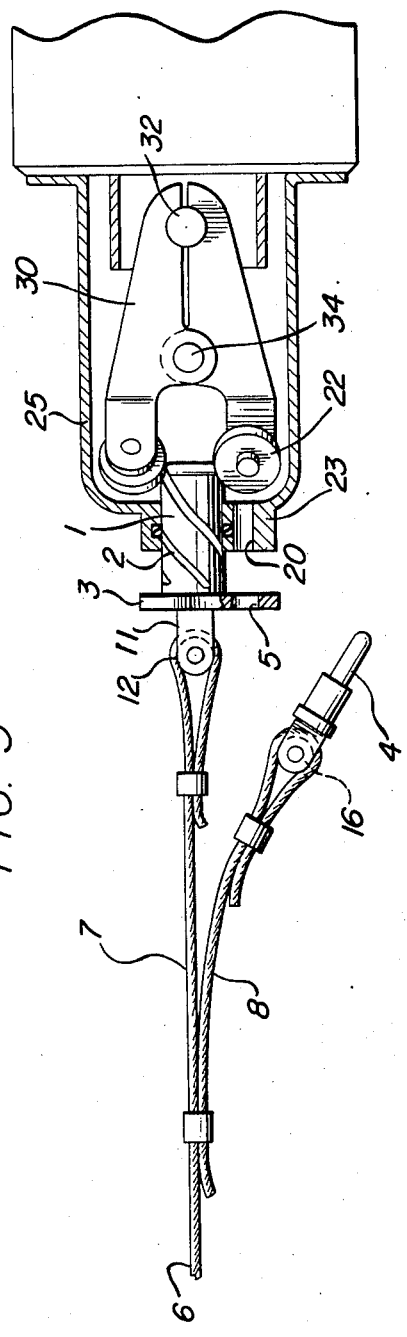
FIG. 3 is a side view depicting the secondary pin fully released and the main pin partially released from a housing.

FIG. 3 shows the pull pin release system of FIG. 1 in a partly released condition. In operation a pull to the left on lanyard 6 first causes a retraction force on the shorter split lanyard 8. In response to that retraction force the secondary pin 4 is pulled free from its receiving aperture 5 in flange 3 and free from the secondary pin's bore 20 in housing 25. The longer lanyard end 7 then imparts a retraction force on the main pin 1 via pulley 12. The flange 3 and main pin 1 respond to the retraction force by rotating in a counter-clockwise direction until the main pin 1 is fully released from housing 25.

Figure 4:
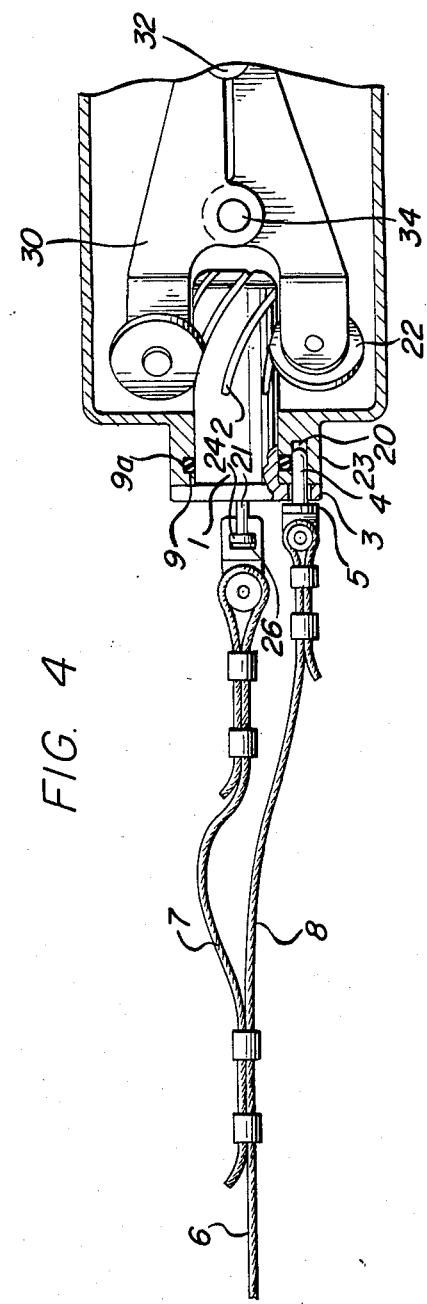
FIG. 4 is a partial cross-sectional view of the assembly in an armed, or locked, position.

A partial cross-section in FIG. 4 discloses the operational details which provide a dual-retention and redundant function for the pull pin system of this invention. Assume an inertial load attempts to disengage the main pin 1. Since the main pin 1 must rotate as it moves toward a release position, its rotation will be prevented by the secondary pin 4. Secondary pin 4, which pin remains firmly seated in its bore 20, will strike one side of aperture 5 in flange 3. The rotational force imparted to main pin 1 is thus countered by a force of the secondary pin 4 in the receiving bore 20 and against the shoulder of the receiving pin's aperture 5 in flange 3. Thus both pins 1 and 4 are opposing each other and one primary locking feature is provided by the pins themselves.

The amount of rotation of pin 1 on insertion and retraction may be less than one full revolution. Such a small amount of rotation may easily be taken up by twisting of slack in the lanyard end 7. In the event a very stiff lanyard end 7 were necessary, the arrangement shown in cross-section in FIG. 4 would rotatably connect bracket 11 to flange 3. Connected to flange 3 is a shank 21 having an oversized head 24. Head 24 acts as a bearing in a race slot 26 that is located at the end of bracket 11. The head 24 and bearing race 26 permit rotation as the main pin 1 is removed.

A friction locking means is disclosed in FIGS. 3 and 4. Note that "O"-ring 9, FIG. 4, is seated in a groove 9a in housing 25, which groove 9a surrounds the shoulder of main pin 1. In the lower portion of FIG. 4 the "O"-ring 9 is exposed to both pins 1 and 4 at a contact point. The pin 4, when in a seated or locked position, compresses "O"-ring 9 to frictionally hold both the main pin 1 and secondary pin 4 from moving. Both main pin 1 and secondary pin 4 are thus double locked. The double locking is provided first by frictional locking, which results from sharing a common contact on "O"-ring 9 and from counteracting forces created by the pins opposing themselves if subjected to an accidental release force.

In response to a pull on lanyard 6, first the secondary pin 4 is fully released and next the main pin 1 is fully released in the manner described earlier. Full release of main pin 4 may trigger any well-known mechanism. For example, FIGS. 3 and 4 depict a pair of scissor release jaws 30 which have been placed into a closed position by the seating of main pin 1. In the position shown, the right-hand side of jaws 30 have seized a pin 32 which may be, for example, a parachute ring or similar type assembly. Jaws 30 would normally be open, but the insertion of main pin 1 forces the rear portion of jaws 30 to pivot about the jaws pivot pin 34.

Located at the rearward portion of jaws 30 are a pair of suitably journaled guide wheels 22. The pair of wheels 22 rise in the spiral grooves 2 of main pin 1. Obviously while riding in the grooves 2, the wheels 22 have locked the scissor jaws 30 around pin 32. When fully released and main pin 1 has been removed, the pair of wheels 22 will quickly move toward each other due to the preloaded condition of jaws 30. Such movement releases pin 32 of a mechanism to be operated. A typical example would be a parachute.

Although a pair of wheels 22 ride in the spiral grooves 2 of main pin 1 in a well-known fashion, other approaches well known to the art may be employed equally as well. For example, mating threads could take the place of wheels 22. Obviously, the spiral surface on main pin 1 could be raised threads engaging with corresponding female grooves within the collar 23 of housing 25. Other modifications will readily suggest themselves to those of ordinary skill in the pull pin release art without departing from the spirit and scope of the claimed invention.

What is claimed is:

1. A double-retention redundant pull pin release system for a housing comprising:

an elongated main pin with a head flange having an aperture therein aligned with the elongation of the main pin, said aperture adapted to receive a secondary pin;

a first recess in said housing for said main pin, said recess and said main pin provided with means which cause the main pin and its flange to rotate upon tendency to release from a fully-seated position in said first recess;

an elongated secondary pin having a diameter slightly less than said aperture in said flange;

a second recess in said housing having an axis parallel to said main pin recess for receiving said secondary pin when it is seated through said flange aperture and into said second recess;

first rotational retention means comprising said secondary pin seated in said flange aperture and in said second recess for preventing rotation and thus accidental release of said main pin; and second frictional retention means comprising a friction contact surface commonly shared by said main and secondary pins.

2. The system of claim 1 further comprising:

a split pull lanyard having a long and a short pull line at the end thereof;

means fastening the long pull line to said main pin's flange; and means fastening the short end to said secondary pin for its full intentional release free of the secondary recess and the flange aperture before an intentional pull on said long pull line begins to release said main pin.

3. A double retention pull pin release system for a housing, said system comprising:

first retention means including a main pin rotatably driven during extraction from a bore in said housing;

second retention means including a secondary pin seated in an opening in said housing for preventing rotation and thus accidental extraction of said main pin; and means for releasing sequentially first said secondary pin from its opening and thereafter rotating said main pin from its bore to disarm said system.

4. A system in accordance with claim 3 and wherein said first retention means further comprises:
said main pin and said bore having spiral mating grooves and engaging said grooves means which cause the main pin to rotate upon tendency to release from a fully-seated position in said bore.

5. A system in accordance with claim 4 and wherein said first retention means further comprises:
a head flange on said main pin adapted to seat against said housing when said main pin is in a fully-seated position.

6. A system in accordance with claim 5 and wherein said first retention means further comprises:
an aperture located in said flange and alignable with said secondary pin opening for receiving said secondary pin when said system is in an armed position.

7. A system in accordance with claim 3 and wherein said second retention means further comprises:
said secondary pin being undersized relative to the size of its opening, said secondary pin being responsive to a force from said releasing means for full extraction from said opening.

8. A system in accordance with claim 7 and wherein said second retention means further comprises:
a smooth surface on said secondary pin and inside said opening to enhance easy removal from said opening.

9. A system in accordance with claim 3 and wherein said second releasing means further comprises:
a first lanyard receiving means mounted on said main pin exterior of said housing;
a second lanyard receiving means mounted on said secondary pin exterior of said housing; and
a split lanyard having a longer and a shorter end with said longer end coupled to said first lanyard receiving means and with said shorter end coupled to said second lanyard receiving means.

10. A system in accordance with claim 3 and further comprising:
redundancy retention means frictionally engaging said first and second retention means for enhancing said system's resistance to accidental disarming.

11. A system in accordance with claim 10 wherein said redundancy retention means further comprises:
a frictional contact compressibly located between said first and said second retention means.

12. A system in accordance with claim 11 wherein said redundancy retention means further comprises:
a circular "O"-ring surrounding said main pin and sharing a contact point in common with said main and said secondary pin.

13. A system in accordance with claim 10 and wherein said first retention means further comprises:
an elongated pin and said bore having spiral mating grooves and riser means which cause the main pin to rotate upon tendency to release from a fully-seated position in said bore.

14. A system in accordance with claim 13 and wherein said first retention means further comprises:
a head flange on said main pin adapted to seat against said housing when said main pin is in a fully-seated position.

15. A system in accordance with claim 14 and wherein said first retention means further comprises:
an aperture located in said flange and alignable with said secondary pin opening for receiving said secondary pin when said system is in an armed position.

16. A system in accordance with claim 10 and wherein said second retention means further comprises:
said secondary pin being undersized relative to the size of its opening, said secondary pin being responsive to a force from said releasing means for full extraction from said opening.

17. A system in accordance with claim 16 and wherein said second retention means further comprises:
a smooth surface on said secondary pin and inside said opening to enhance easy removal from said opening.

18. A system in accordance with claim 10 and wherein said second releasing means further comprise:
a first lanyard receiving means mounted on said main pin exterior of said housing;
a second lanyard receiving means mounted on said secondary pin exterior of said housing; and
a split lanyard having a longer and a shorter end with said longer end coupled to said first lanyard receiving means and with said shorter end coupled to said second lanyard receiving means.

19. A double-retention redundant pull pin release system for a housing comprising:
an elongated main pin with a head flange having an aperture therein aligned with the elongation of the main pin, said aperture adapted to receive a secondary pin;
a first recess in said housing for said main pin, said recess and said main pin provided with means which cause the main pin and its flange to rotate upon tendency to release from a fully-seated position in said first recess;
an elongated secondary pin having a diameter slightly less than said aperture in said main pin flange;
a second recess in said housing having an axis parallel to said main pin recess for receiving said secondary pin when it is seated through said flange aperture and into said second recess;
first rotational retention means comprising said secondary pin seated in said flange aperture and said second recess for preventing rotation and thus accidental release of said main pin; and
second frictional retention means comprising a friction contact surface commonly shared by said main and secondary pins.

20. The system of claim 19 further comprising:
a split pull lanyard having a long and a short pull line at the end thereof;
means fastening the long pull line to said main pin's flange; and
means fastening the short end to said secondary pin for its full intentional release free of the secondary recess and the flange aperture before the intentional pull on said long pull line begins to release said main pin.

* * * * *